US 12,126,841 B2

(12) United States Patent
Gao et al.

(10) Patent No.: US 12,126,841 B2
(45) Date of Patent: Oct. 22, 2024

(54) FEATURE COMPRESSION FOR VIDEO CODING FOR MACHINES

(71) Applicant: TENCENT AMERICA LLC, Palo Alto, CA (US)

(72) Inventors: Wen Gao, West Windsor, NJ (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 14 days.

(21) Appl. No.: 17/940,374

(22) Filed: Sep. 8, 2022

(65) Prior Publication Data
US 2023/0086521 A1    Mar. 23, 2023

Related U.S. Application Data

(60) Provisional application No. 63/246,217, filed on Sep. 20, 2021.

(51) Int. Cl.
*H04N 19/88* (2014.01)
*H04N 19/105* (2014.01)
*H04N 19/136* (2014.01)
*H04N 19/172* (2014.01)
*H04N 19/189* (2014.01)

(52) U.S. Cl.
CPC ........... *H04N 19/88* (2014.11); *H04N 19/105* (2014.11); *H04N 19/136* (2014.11); *H04N 19/172* (2014.11); *H04N 19/189* (2014.11)

(58) Field of Classification Search
CPC .... H04N 19/88; H04N 19/105; H04N 19/136; H04N 19/172; H04N 19/189
See application file for complete search history.

(56) References Cited

U.S. PATENT DOCUMENTS

| 2003/0048853 | A1 | 3/2003 | Oh et al. |
| 2013/0336594 | A1 | 12/2013 | Dorairaj |
| 2014/0205015 | A1* | 7/2014 | Rusert ................. H04N 19/523 375/240.12 |
| 2016/0094848 | A1 | 3/2016 | Kim et al. |

(Continued)

FOREIGN PATENT DOCUMENTS

| CA | 2360364 A1 | 6/2001 |
| JP | 2023-542876 A | 10/2023 |

(Continued)

OTHER PUBLICATIONS https://web.archive.org/web/20210725115748/https://-mathworld. wolfram.com/CorrelationCoefficient.html, hereafter "Mathworld NPL". (Year: 2021).*

(Continued)

*Primary Examiner* — Kyle M Lotfi
(74) *Attorney, Agent, or Firm* — Sughrue Mion, PLLC

(57) ABSTRACT

Systems, devices, and methods for performing feature compression, including obtaining an input video; obtaining a feature map corresponding to the input video, the feature map including a plurality of feature channels; reordering the plurality of feature channels based on at least one characteristic of the plurality of feature channels; compressing the reordered plurality of feature channels; and generating an encoded bitstream based on the compressed and reordered plurality of feature channels.

15 Claims, 5 Drawing Sheets

(56) References Cited

U.S. PATENT DOCUMENTS

| | | | | |
|---|---|---|---|---|
| 2020/0410290 | A1* | 12/2020 | Shen | G06N 3/08 |
| 2021/0279594 | A1 | 9/2021 | Jiang et al. | |
| 2023/0082448 | A1* | 3/2023 | Pan | G06N 3/08 |
| | | | | 706/15 |
| 2023/0247200 | A1* | 8/2023 | Yu | H04N 19/42 |
| | | | | 375/240.03 |

FOREIGN PATENT DOCUMENTS

| | | |
|---|---|---|
| WO | 2021/095245 A1 | 5/2021 |
| WO | 2022/086376 A1 | 4/2022 |

OTHER PUBLICATIONS

"Use cases and requirements for Video Coding for Machines", ISO/IEC JTC 1/SC 29/WG 2, N18, Oct. 16, 2020, 19 total pages.

"Evaluation Framework for Video Coding for Machines", ISO/IEC JTC 1/SC 29/WG 2, N19, Oct. 16, 2020, 50 total pages.

"Call for Evidence for Video Coding for Machines", ISO/IEC JTC 1/SC 29/WG 2, N20, Oct. 16, 2020, 12 total pages.

International Search Report dated Feb. 2, 2023 in Application No. PCT/US22/43030.

Written Opinion of the International Searching Authority dated Feb. 2, 2023 in Application No. PCT/US22/43030.

Extended European Search Report dated Jan. 16, 2024 in European Application No. 22868442.9.

Yong-Uk et al., "[VCM] Compression of reordered feature sequences based on channel means for object detection", International Organisation for Standardisation Organisation Internationale de Normalisation, ISO/IEC JTC 1/SC 29/WG 2, m57497, Jul. 2021 (3 pages total).

Chen et al., "Data Representation in Hybrid Coding Framework for Feature Maps Compression", IEEE, 2020 IEEE International Conference on Image Processing (ICIP), Oct. 25, 2020, pp. 3094-3098 (5 pages total).

Office Action issued Mar. 28, 2024 in Chinese Application No. 202280006645.9.

Notice of Refusal dated Jun. 4, 2024 in Japanese Application No. 2023-528039.

* cited by examiner

… (1) …

FEATURE COMPRESSION FOR VIDEO CODING FOR MACHINES

CROSS-REFERENCE TO RELATED APPLICATION

This application claims priority from U.S. Provisional Application No. 63/246,217, filed on Sep. 20, 2021, in the United States Patent and Trademark Office, the disclosure of which is incorporated herein by reference in its entirety.

FIELD

Embodiments of this disclosure are directed to video coding, and more particularly feature compression consistent with video coding for machines (VCM).

BACKGROUND

Video or images may be consumed by human users for a variety of purposes, for example entertainment, education, etc. Thus, video coding or image coding may often utilize characteristics of human visual systems for better compression efficiency while maintaining good subjective quality.

Recently, with the rise of machine learning applications, along with the abundance of sensors, many intelligent platforms have utilized video for machine vision tasks such as object detection, segmentation or tracking. As a result, encoding video or images for consumption by machine tasks has become an interesting and challenging problem. This has lead to the introduction of Video Coding for Machines (VCM) studies. To achieve this goal, the international standard group MPEG has created an Ad-Hoc group, "Video coding for machines (VCM)" to standardize related techniques for better interoperability among difference devices.

SUMMARY

According to one or more embodiments, a method of performing feature compression is executed by at least one processor and includes obtaining an input video; obtaining a feature map corresponding to the input video, the feature map comprising a plurality of feature channels; reordering the plurality of feature channels based on at least one characteristic of the plurality of feature channels; compressing the reordered plurality of feature channels; and generating an encoded bitstream based on the compressed and reordered plurality of feature channels.

According to one or more embodiments, a device for performing feature compression includes at least one memory configured to store program code; and at least one processor configured to read the program code and operate as instructed by the program code, the program code including: first obtaining code configured to cause the at least one processor to obtain an input video; second obtaining code configured to cause the at least one processor to obtain a feature map corresponding to the input video, the feature map comprising a plurality of feature channels; reordering code configured to cause the at least one processor to reorder the plurality of feature channels based on at least one characteristic of the plurality of feature channels; compressing code configured to cause the at least one processor to compress the reordered plurality of feature channels; and generating code configured to cause the at least one processor to generate an encoded bitstream based on the compressed and reordered plurality of feature channels.

According to one or more embodiments, a non-transitory computer-readable medium stores instructions, the instructions including: one or more instructions which, when executed by one or more processors of a device for performing feature compression, cause the one or more processors to: obtain an input video; obtain a feature map corresponding to the input video, the feature map comprising a plurality of feature channels; reorder the plurality of feature channels based on at least one characteristic of the plurality of feature channels; compress the reordered plurality of feature channels; and generate an encoded bitstream based on the compressed and reordered plurality of feature channels.

BRIEF DESCRIPTION OF THE DRAWINGS

Further features, the nature, and various advantages of the disclosed subject matter will be more apparent from the following detailed description and the accompanying drawings in which:

FIG. 5 is a flowchart of an example process for performing, feature compression, according to embodiments.

DETAILED DESCRIPTION

Figure 1:
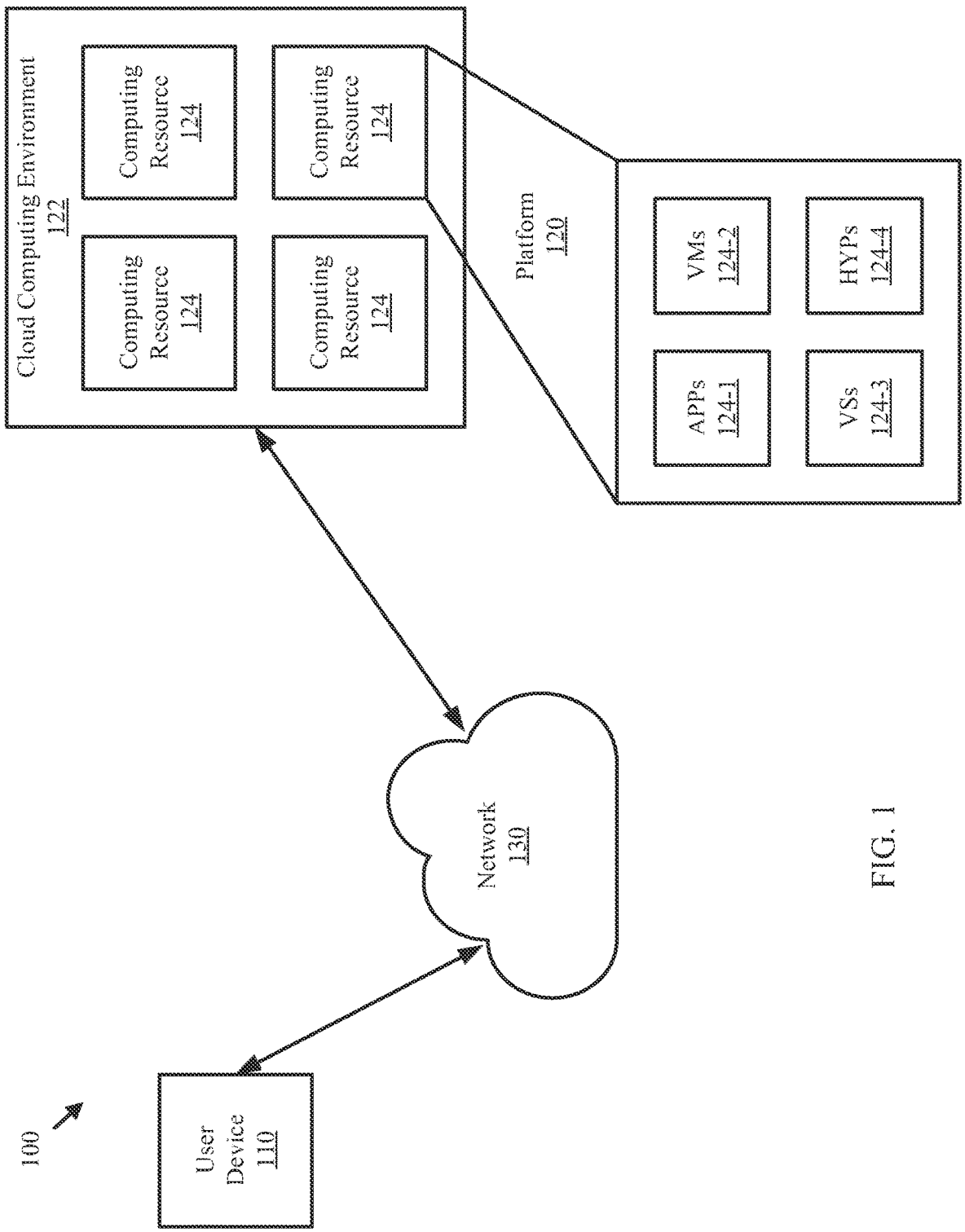
FIG. 1 is a diagram of an environment in which methods, apparatuses, and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. in some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("API's") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
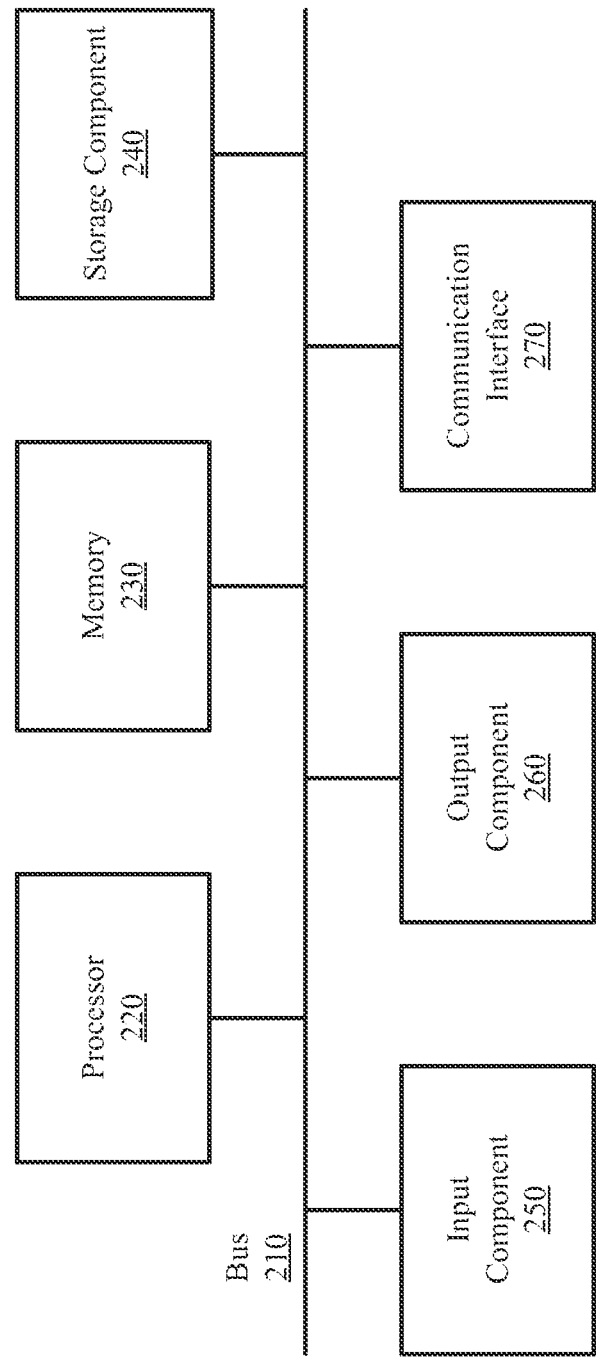
FIG. 2 is a block diagram of example components of one or more devices of FIG. 1.

FIG. 2 is a block diagram of example components of one or more devices of FIG. 1, The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuators. The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

Figure 3:
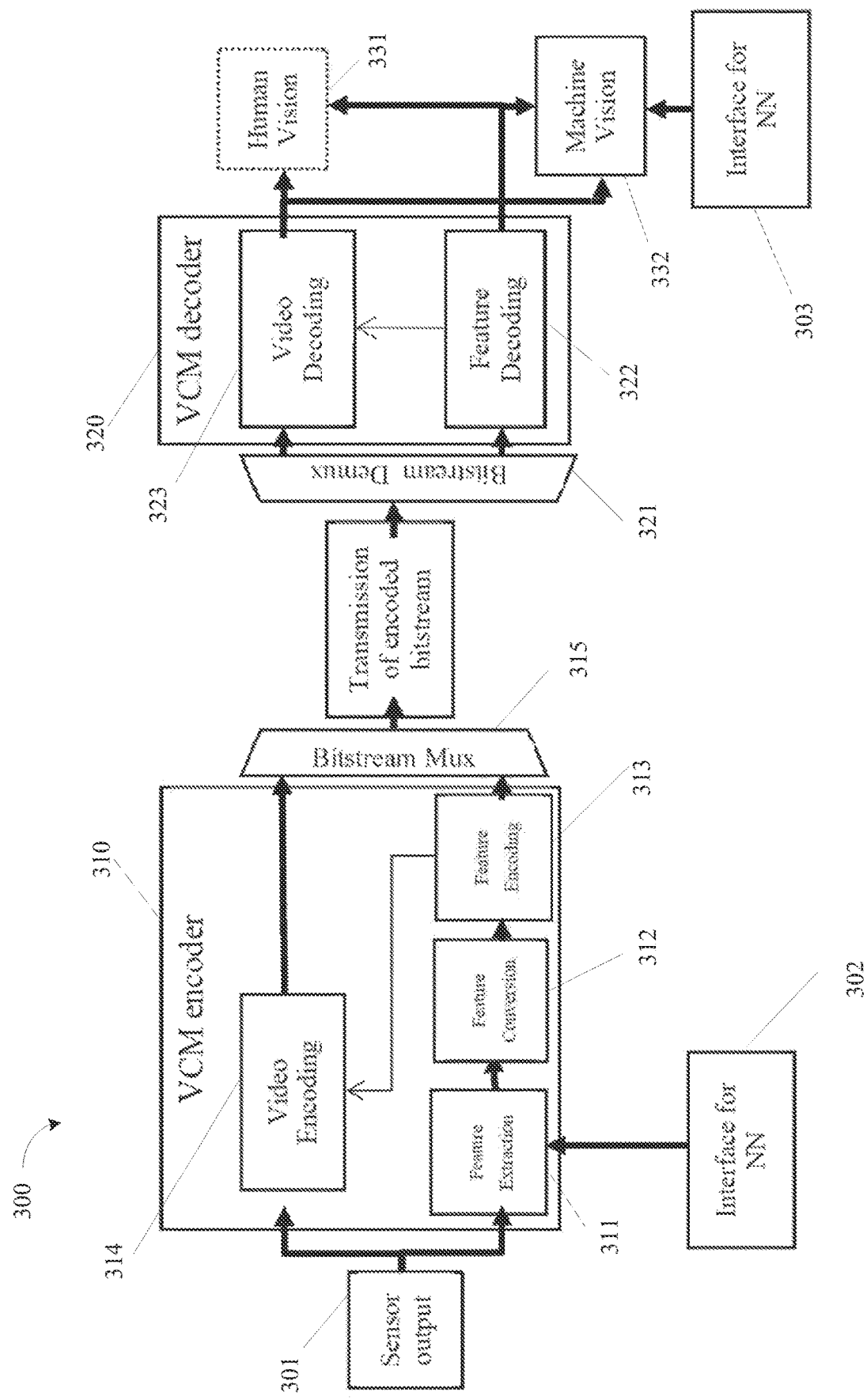
FIG. 3 is a block diagram of an example architecture for performing video coding, according to embodiments.

FIG. 3 is a block diagram of an example architecture 300 for performing video coding, according to embodiments. In embodiments, the architecture 300 may be a video coding for machines (VCM) architecture, or an architecture that is otherwise compatible with or configured to perform VCM coding. For example, architecture 300 may be compatible with "Use cases and requirements for Video Coding for Machines" (ISO/IEC JTC 1/SC 29/WG 2 N18), "Draft of Evaluation Framework for Video Coding for Machines" (ISO/IEC JTC 1/SC 29/WG 2 N19), and "Call for Evidence for Video Coding for Machines" (ISO/IEC JTC 1/SC 29/WG 2 N20), the disclosures of which are incorporated by reference herein in their entireties.

In embodiments, one or more of the elements illustrated in FIG. 3 may correspond to, or be implemented by, one or more of the elements discussed above with respect to FIGS. 1-2, for example one or more of the user device 110, the platform 120, the device 200, or any of the elements included therein.

As can be seen in FIG. 3, the architecture 300 may include a VCM encoder 310 and a VCM decoder 320. In embodiments, the VCM encoder may receive sensor input 301, which may include for example one or more input images, or an input video. The sensor input 301 may be provided to a feature extraction module 311 which may extract features from the sensor input, and the extracted features may be converted using feature conversion module 312, and encoded using feature encoding module 313. In embodiments, the term "encoding" may include, may correspond to, or may be used interchangeably with, the term "compressing". The architecture 300 may include an interface 302, which may allow the feature extraction module 311 to interface with a neural network (NN) which may assist in performing the feature extraction.

The sensor input 301 may be provided to a video encoding module 314, which may generate an encoded video. In embodiments, after the features are extracted, converted, and encoded, the encoded features may be provided to the video encoding module 314, which may use the encoded features to assist in generating the encoded video. In embodiments, the video encoding module 314 may output the encoded video as an encoded video bitstream, and the feature encoding module 313 may output the encoded features as an encoded feature bitstream. In embodiments, the VCM encoder 310 may provide both the encoded video bitstream and the encoded feature bitstream to a bitstream multiplexer 315, which may generate an encoded bitstream by combining the encoded video bitstream and the encoded feature bitstream.

In embodiments, the encoded bitstream may be received by a bitstream demultiplexer (demux), which may separate the encoded bitstream into the encoded video bitstream and the encoded feature bitstream, which may be provided to the VCM decoder 320. The encoded feature bitstream may be provided to the feature decoding module 322, which may generate decoded features, and the encoded video bitstream may be provided to the video decoding module, which may generate a decoded video. In embodiments, the decoded features may also be provided to the video decoding module 323, which may use the decoded features to assist in generating the decoded video.

In embodiments, the output of the video decoding module 323 and the feature decoding module 322 may be used mainly for machine consumption, for example machine vision module 332. In embodiments, the output can also be used for human consumption, illustrated in FIG. 3 as human vision 331. A VCM system, for example the architecture 300, from the client end, for example from the side of the VCM decoder 320, may perform video decoding to obtain the video in the sample domain first. Then one or more machine tasks to understand the video content may be performed, for example by machine vision module 332. In embodiments, the architecture 300 may include an interface 303, which may allow the machine vision module 332 to interface with an NN which may assist in performing the one or more machine tasks.

As can be seen in FIG. 3, besides a video encoding and decoding path, which includes the video encoding module 314 and the video decoding module 323, another path included in the architecture 300 is a feature extraction, feature encoding, and feature decoding path, which includes the feature extraction module 311, the feature conversion module 312, the feature encoding module 313, and the feature decoding module 322, Examples relating to these paths are discussed in more detail below.

In embodiments, features extracted from the source images or source videos, for example the sensor input 301, in the VCM encoder 310, can be directly utilized by machine vision networks in the VCM decoder 320 or in the machine vision module 332. In this case, there may be no need for feature extraction in the VCM decoder 320. Thus, power saving can be achieved in the VCM encoder 310, especially in the cases in which features can be used for multiple machine vision tasks.

Figure 4:
FIG. 4 is a block diagram of an example feature map, according to embodiments.

A feature map, or feature map signal, extracted from an input image or input video may be represented as a three dimensional array, which may be denoted as $F_{n,h,w}$, where n, h, w are non-negative integers, $0 \leq n < N$, $0 \leq h < H$, $0 \leq w < W$, and where N represents the number of feature channels, H represents the height of each feature channel, and W represents the width of each feature channel. FIG. 4 is a block diagram of an example feature map 400, according to embodiments. As can be seen in FIG. 4, feature map 400 may include N channels 400-1, 400-2, 400-3, . . . , 400-n, corresponding to n=0, n=1, n=2, . . . , 400-n, respectively.

In embodiments, if $F_{n,h,w}$ are expressed as floating numbers, they may be converted to integer numbers through mean subtraction, scaling and quantization process. Similar to source images or video, a feature map may be compressed at the VCM encoder 310, for example using feature encoding module 313, before being sent to the VCM decoder 320 due to large e of data. Thus, feature compression is also an important topic in VCM.

However, in a feature map, $F_{n,h,w}$, different feature channels may exhibit different characteristics. Adjacent feature channels are not necessarily similar highly correlated. It may therefore be desirable to reorder feature channels in a feature map such that similar and correlated feature channels are placed adjacent to each other for better compression efficiency. Therefore, embodiments of the present disclosure may relate to methods of reordering feature channels and the corresponding signaling methods for feature compression.

In embodiments, feature channels in a feature map may be reordered based on characteristics of each feature channel. For example, the mean or variance of each feature channel in a feature map may be computed, and the feature channels may be reordered based on the computed feature channel mean or feature channel variance, for example based on increasing or decreasing order of the feature channel mean or feature channel variance, or any other statistics-based criteria. Mean may be considered a first order moment of a feature channel, and variance may be considered the second order moment of a feature channel. In embodiments, a higher order moment, for example a third order moment, may also be used to reorder feature channels.

In embodiments, feature channels in a feature map may be reordered based on a metric that measures similarity among feature channels. For example, a correlation coefficient can be computed between a pair of feature channels, such as the i-th feature channel and the j-th feature channel. In embodiments, the correlation coefficient may correspond to a ratio between a covariance of the pair of feature channels and a product of standard deviations of the pair of feature channels.

In embodiments, the correlation coefficient may be calculated as shown in Equation 1 below:

$$\rho_{i,j} = \frac{\frac{1}{WH}\sum_{h=0}^{H-1}\sum_{w=0}^{W-1}(F_{i,h,w}-\mu_i)(F_{j,h,w}-\mu_j)}{\sigma_i \sigma_j} \quad \text{Equation 1}$$

In Equation 1, $\rho_{i,j}$ may represent the correlation coefficient between the i-th feature channel and the j-th feature channel, $\mu_i$ may represent the mean of the i-th feature channel, $\mu_j$ may represent the mean of the j-th feature channel, $\sigma_i$ may represent the standard deviation of the i-th feature channel, $\sigma_j$ may represent the standard deviation of j-th feature channel.

After computing the pair-wise feature channel correlation coefficients, one or more anchor feature channels, for example K anchor feature channels, may be selected, the rest of the feature channels may be clustered based on their correlation coefficients with the K anchor feature channels. For example, the K anchor feature channels may be denoted as a(k), k=0, . . . , K−1 where a(k) represents the feature channel index for the k-th anchor feature channel, if the m-th feature channel, where m is not in the set {a(0), a(1), . . . , a(K−1)}, has a largest correlation coefficient with a(k), compared with its correlation coefficients with (a1), . . . , a(k−1), a(k+1), . . . , a(K−1), the m-th feature channel may be classified as part of the cluster of a(k). Within each cluster, feature channels may be sorted based feature channel characteristics such as feature channel mean or variance, etc. The clusters may be sorted based on cluster mean or variance, or sorted based on the correlation coefficients between a(k), k=1, . . . , K−1 and a(0), where the cluster of a(0) is placed at the beginning, without loss of generality.

In embodiments, a variety of methods may be used to select the K anchor feature channels. For example, every $$\frac{N}{K}-th$$

feature channel may be selected as the K feature channels if the N feature channels are sorted based on feature channel characteristics such as mean or variance. In embodiments, aside from the above clustering methods, other clustering methods may be used, for example a hierarchical clustering method based on the correlation distance.

In embodiments, for each feature channel, the feature channel's correlation coefficients with all of the other feature channels may be added together to obtain a total correlation coefficient. Then all feature channels may be reordered based on the total correlation coefficients, for example in decreasing order or an increasing order.

In embodiments, other feature channel similarity metrics such as Levene Test or KL divergence may be used to reorder the feature channels.

In the VCM encoder 310, the feature channels may be reordered as discussed above, and the reordered feature channels may be compressed using video coding techniques, for example high efficiency video coding (HEVC), versatile video coding (VVC), or any other video coding technique as desired. Besides the coded bitstream, information about the order of the feature channels in a feature map may be signaled to allow the VCM decoder 320 to recover the original order of the feature channels after all of the feature channels are decoded.

In embodiments, information about the order of the reordered feature channels may be explicitly signaled using a permutation sequence of the numbers {0, 1, . . . , N−1} corresponding to the N feature channels, denoted as {P(0), P(1), . . . , P(N−1)}, where P(k) for k=0, 1, . . . , N−1 indicates its original order in the feature map before reordering.

In embodiments, information about only the feature channels that change their positions relative to the original ones may be signaled. For example, the k-th feature channel in the reordered feature map may be the P(k)-th feature channel in its original order. In this case, information indicating the pair (k, P(k)) may be signaled in the bitstream. When the portion of feature channels that change positions is not large, signaling of the information about the pairs of values for those feature channels that change positions may be more efficient in terms of bits saving.

In embodiments, the difference value between the original position and the new positions may be signaled for the reordered feature channels. For example, information indicating {k−P(k)} for k=0, 1, . . . , N−1 may be signaled in the bitstream. If a large portion of feature channels do not change position, the corresponding k−P(k)=0, which may use fewer bits to signal the reordering relationship in the bitstream.

In embodiments, the order of the reordered feature channels may be implicitly signaled. For example, if a feature channel mean is used to sort the source feature channels in a feature map, the mean values of each feature channel may be signaled in the original order in the bitstream. The VCM decoder 320 may then sort the mean values to determine how the feature channels were reordered. In embodiments, if the variance or another metric is used to sort the feature channels, similar methods can be applied.

As discussed above, feature channels in a feature map may be sorted and fed into an encoder, for example feature encoding module 313, which may then determine a reference feature channels for a given feature channel based its algorithm. In embodiments, a feature channel may be treated as a picture when being coded by a 2-dimensional video codec such as HEVC, VVC, etc. For example, the feature encoding module 313 may first divide the feature channels into one or more group of pictures (GOP) structures and build one or more reference picture lists within a GOP, such as a hierarchical reference picture list.

In embodiments, the feature encoding module 313 may determine the one or more reference feature channels for a given feature channel based on the feature channel similarity metric as described above. For example, before encoding, all feature channels may be in the original order or reordered based on feature channel characteristics such as mean or variance. During the encoding process, the feature encoding module 313 may still divide the feature channels into GOPs, or treat all feature channels as one GOP. Within a GOP, feature channels with larger total feature channel coefficients may be encoded first. When selecting reference feature channels for a feature channel being coded, only feature channels with relatively larger similarity metric may be chosen. The selected codec may use its own standard compliant method to signal the reordering results of the reference picture list.

In embodiments, the encoder can treat the K clusters described above as K GOPs and encode them independently, because the feature channels in different clusters may be less similar, and the benefits of referring to feature channels in other clusters may be less.

FIG. 5 is a flowchart of example process 500 for performing feature compression. In some implementations, one or more process blocks of FIG. 5 may be performed by any of the elements discussed above, for example VCM encoder 310 or elements included therein, such as feature extraction module 311, feature conversion module 312, or feature encoding module 313.

As shown in FIG. 5, process 500 may include obtaining an input video (block 5).

As further shown in FIG. 5, process 500 may include obtaining a feature map corresponding to the input video (block 504). In embodiments, the feature map may include a plurality of feature channels.

As further shown in FIG. 5, process 500 may include reordering the plurality of feature channels based on at least one characteristic of the plurality of feature channels (block 504).

As further shown in FIG. 5, process 500 may include compressing the reordered plurality of feature channels (block 504). In embodiments, the compressing of the reordered plurality of feature channels may include or correspond to encoding the plurality of feature channels.

As further shown in FIG. 5, process 500 may include generating an encoded bitstream based on the reordered and compressed plurality of feature channels (block 504).

In embodiments, the at least one characteristic may include at least one of a mean of the plurality of feature channels, a variance of the plurality of feature channels, and a similarity of the plurality of feature channels. In embodiments, the similarity may be determined based on a correlation coefficient between two feature channels of the plurality of feature channels, and the correlation coefficient may correspond to a ratio between a covariance of the two feature channels and a product of standard deviations of the two feature channels.

In embodiments, the two feature channels may include an i-th feature channel and a j-th feature channel of the plurality of feature channels, and the correlation coefficient may be calculated according Equation 1 above.

In embodiments, the plurality of feature channels may be sorted into at least one group of pictures, and at least one reference picture used to generate the encoded bitstream may be selected based on the correlation coefficient.

In embodiments, the reordering may include selecting at least one anchor feature channel from among the plurality of feature channels, and clustering remaining feature channels from among the plurality of feature channels into at least one cluster based on the at least one anchor feature channel.

In embodiments, the reordering may further include ordering the remaining feature channels within the at least one cluster based on at least one from among a mean of the remaining feature channels, a variance of the remaining feature channels, and a similarity of the remaining feature channels.

In embodiments, the reordering may include computing a total correlation coefficient for each feature channel of the plurality of feature channels, and ordering the plurality of feature channels based on the total correlation coefficient.

In embodiments, process 600 may further include signaling an order of the reordered plurality of feature channels in the encoded bitstream.

In embodiments, the order may be signaled by indicating feature channels having changed positions within the reordered plurality of feature channels.

In embodiments, the order may be implicitly signaled.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above can be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items e.g., related items, unrelated items, a combination of related and unrelated items, etc.), and may be used interchangeably with "one or more." Where only one item is intended, the term "one" or similar language is used. Also, as used herein, the terms "has," "have" "having," or the like are intended to be open-ended terms. Further, the phrase "based on" is intended to mea "based, at least in part, on" unless explicitly stated otherwise.

What is claimed is:

1. A method of performing feature compression, the method being executed by at least one processor and comprising:
   obtaining an input video;
   obtaining a feature map corresponding to the input video, the feature map comprising a plurality of feature channels;
   reordering the plurality of feature channels based on at least one characteristic of the plurality of feature channels;
   compressing the reordered plurality of feature channels; and
   generating an encoded bitstream based on the reordered and compressed plurality of feature channels,
   wherein the at least one characteristic comprises a similarity of the plurality of feature channels,
   wherein the similarity is determined based on a correlation coefficient between two feature channels of the plurality of feature channels,
   wherein the correlation coefficient corresponds to a ratio between a covariance of the two feature channels and a product of standard deviations of the two feature channels, and
   wherein the reordering comprises computing a total correlation coefficient for each feature channel of the plurality of feature channels, and ordering the plurality of feature channels based on the total correlation coefficient.

2. The method of claim 1, wherein the two feature channels comprise an i-th feature channel and a j-th feature channel of the plurality of feature channels, and
   wherein the correlation coefficient is calculated according to a following equation:

$$\rho_{i,j} = \frac{\frac{1}{WH}\sum_{h=0}^{H-1}\sum_{w=0}^{W-1}(F_{i,h,w} - \mu_i)(F_{j,h,w} - \mu_j)}{\sigma_i \sigma_j}$$

where $\rho$ represents the correlation coefficient, F represents a three-dimensional array indicating the feature map, W represents a width of the feature map, w represents a width index, H represents a height of the feature map, h represents a height index, $\mu_i$ represents a mean of the i-th feature channel, $\mu_j$ represents a mean of the j-th feature channel, $\sigma_i$ represents a standard deviation of the i-th feature channel, and $\sigma_j$ represents a standard deviation of the j-th feature channel.

3. The method of claim 1, wherein the plurality of feature channels is sorted into at least one group of pictures, and at least one reference picture used to generate the encoded bitstream is selected based on the correlation coefficient.

4. The method of claim 1, wherein the reordering comprises selecting at least one anchor feature channel from among the plurality of feature channels, and clustering remaining feature channels from among the plurality of feature channels into at least one cluster based on the at least one anchor feature channel.

5. The method of claim 4, wherein the reordering further comprises ordering the remaining feature channels within the at least one cluster based on at least one from among a mean of the remaining feature channels, a variance of the remaining feature channels, and a similarity of the remaining feature channels.

6. The method of claim 1, further comprising signaling an order of the reordered plurality of feature channels in the encoded bitstream.

7. The method of claim 6, wherein the order is signaled by indicating feature channels having changed positions within the reordered plurality of feature channels.

8. The method of claim 6, wherein the order is implicitly signaled.

9. A device for performing feature compression, the device comprising:
   at least one memory configured to store program code; and at least one processor configured to read the program code and operate as instructed by the program code, the program code including:

first obtaining code configured to cause the at least one processor to obtain an input video;

second obtaining code configured to cause the at least one processor to obtain a feature map corresponding to the input video, the feature map comprising a plurality of feature channels;

reordering code configured to cause the at least one processor to reorder the plurality of feature channels based on at least one characteristic of the plurality of feature channels;

compressing code configured to cause the at least one processor to compress the reordered plurality of feature channels; and generating code configured to cause the at least one processor to generate an encoded bitstream based on the reordered and compressed plurality of feature channels, wherein the at least one characteristic comprises a similarity of the plurality of feature channels, wherein the similarity is determined based on a correlation coefficient between two feature channels of the plurality of feature channels, wherein the correlation coefficient corresponds to a ratio between a covariance of the two feature channels and a product of standard deviations of the two feature channels, and wherein the reordering comprises computing a total correlation coefficient for each feature channel of the plurality of feature channels, and ordering the plurality of feature channels based on the total correlation coefficient.

10. The device of claim 9, wherein the similarity is determined based on a correlation coefficient between an i-th feature channel and a j-th feature channel of the plurality of feature channels, and wherein the correlation coefficient is calculated according to a following equation:

$$\rho_{i,j} = \frac{\frac{1}{WH}\sum_{h=0}^{H-1}\sum_{w=0}^{W-1}(F_{i,h,w}-\mu_i)(F_{j,h,w}-\mu_j)}{\sigma_i\sigma_j}$$

where $\rho$ represents the correlation coefficient, F represents a three-dimensional array indicating the feature map, W represents a width of the feature map, w represents a width index, H represents a height of the feature map, h represents a height index, $\mu_i$ represents a mean of the i-th feature channel, $\mu_j$ represents a mean of the j-th feature channel, $\sigma_i$ represents a standard deviation of the i-th feature channel, and $\sigma_j$ represents a standard deviation of the j-th feature channel.

11. The device of claim 10, wherein the plurality of feature channels is sorted into at least one group of pictures, and at least one reference picture used to generate the encoded bitstream is selected based on the correlation coefficient.

12. The device of claim 10, wherein the reordering code is further configured to cause the at least one processor to select at least one anchor feature channel from among the plurality of feature channels, and cluster remaining feature channels from among the plurality of feature channels into at least one cluster based on the at least one anchor feature channel.

13. The device of claim 12, wherein the reordering code is further configured to cause the at least one processor to order the remaining feature channels within the at least one cluster based on at least one from among a mean of the remaining feature channels, a variance of the remaining feature channels, and a similarity of the remaining feature channels.

14. The device of claim 9, wherein the program code further comprises signaling code configured to cause the at least one processor to signal an order of the reordered plurality of feature channels in the encoded bitstream.

15. A non-transitory computer-readable medium storing instructions, the instructions comprising: one or more instructions which, when executed by one or more processors of a device for performing feature compression, cause the one or more processors to:

obtain an input video;

obtain a feature map corresponding to the input video, the feature map comprising a plurality of feature channels;

reorder the plurality of feature channels based on at least one characteristic of the plurality of feature channels;

compress the reordered plurality of feature channels; and generate an encoded bitstream based on the reordered and compressed plurality of feature channels, wherein the at least one characteristic comprises a similarity of the plurality of feature channels, wherein the similarity is determined based on a correlation coefficient between two feature channels of the plurality of feature channels, wherein the correlation coefficient corresponds to a ratio between a covariance of the two feature channels and a product of standard deviations of the two feature channels, and wherein the reordering comprises computing a total correlation coefficient for each feature channel of the plurality of feature channels, and ordering the plurality of feature channels based on the total correlation coefficient.

* * * * *